(12) United States Patent
Perez-Freire et al.

(10) Patent No.: US 8,370,958 B2
(45) Date of Patent: Feb. 5, 2013

(54) DECODING METHOD FOR A PROBABILISTIC ANTI-COLLUSION CODE COMPRISING THE SELECTION OF THE COLLUSION STRATEGY

(75) Inventors: Luis Perez-Freire, Pontevedra (ES); Teddy Furon, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 324 days.

(21) Appl. No.: 12/800,044

(22) Filed: May 6, 2010

(65) Prior Publication Data

US 2010/0287614 A1 Nov. 11, 2010

(30) Foreign Application Priority Data

May 7, 2009 (FR) ...................................... 09 53073

(51) Int. Cl.
*G06F 21/00* (2006.01)
(52) U.S. Cl. .......................................... 726/32; 713/179
(58) Field of Classification Search .......................... None
See application file for complete search history.

(56) References Cited

U.S. PATENT DOCUMENTS 7,047,413 B2 * 5/2006 Yacobi et al. ................. 713/176
2009/0049558 A1 2/2009 Lotspiech

OTHER PUBLICATIONS

Amiri, E, et al., "High Rate Fingerprinting Codes and the Fingerprinting Capacity," 2009, Symposium on Discrete Algorithms Archive Proceedings of the 20th Annual ACM-SIAM.

Anthapadmanabhan, N., "Randon Codes and Graphs for Secure Communication", 2009, Dissertation Univ of Md, pp. A,B, C, I, -X, 1-170.
Blayer, O. et al., "Improved Versions of Tardosa Fingerprinting Scheme", 2008, Designs, Codes and Cryptography, Kluwer vol. 48, No. 1, pp. 79-103.
Cerou, F. et al., "Experimental Assessment of the Reliability for Watermarking and Fingerprinting Schemes", 2008, EURASIP Journal on Information Security, Hindawi Pub Corp.
Furon, T. et al., "On the Design and Optimization of Tardos Probabilistic Fingerprinting Codes", 2008, Information Hiding; Springer Berlin Heidelberg, pp. 341-356.
Katzenbeisser, S. et al., "Combining Tardos Fingerprinting Codes and Fingercasting", 2006. Information Hiding; Springer Berlin Heidelbrer, Berlin, pp. 294-310.

(Continued)

*Primary Examiner* — Gilberto Barron, Jr.
*Assistant Examiner* — Jaron Brunner
(74) *Attorney, Agent, or Firm* — Tutunjian & Bitetto, P.C.

(57) ABSTRACT

The invention relates to a decoding method for a probabilistic anti-collusion code aiming to identify at least one sequence of the code present in a multimedia content having served in the creation of an illegal copy of the multimedia content, this method comprising a step of selection of the collusion strategy used to constitute the illegal copy from among a set of collusion strategy models. In addition, the invention relates to a method for filtering sequences of a probabilistic anti-collusion code for the decoding of this code aiming to identify at least one sequence of the code present in a multimedia content having served in the creation of an illegal copy of the multimedia content comprising a step of selection of a sub-group of the smallest possible sequences of code containing at least one sequence present in a multimedia content having served in the creation of the illegal copy by comparing for each sequence of the code and for a selected given symbol index, the symbol of the sequence of the code with the symbol of the sequence contained in the illegal copy.

12 Claims, 6 Drawing Sheets

OTHER PUBLICATIONS

Moulin, P., "Universal Fingerprinting: Capacity and Random-Coding Exponents", 2008, Online http://arxiv.org/PS_cache/arxiv/pdf/0801/0801.3837 vs.pdf, pp. 1-57.

Skoric, B. et al., "Tardos Fingerprinting IS Better Than We Thought", 2008. IEEE Transactions on Information Theory, IEEE, US, vol. 54, No. 8, pp. 3663-3676.

Tassa, T., "Low Bandwidth Dynamic Traitor Tracing Schemes", 2005, Journal of Cryptology, Springer-Verlag, NE, vol. 18, No. 2, pp. 167-183.

French Search Report for FR 0953073 dated Mar. 16, 2010.

* cited by examiner

DECODING METHOD FOR A PROBABILISTIC ANTI-COLLUSION CODE COMPRISING THE SELECTION OF THE COLLUSION STRATEGY

FIELD OF THE INVENTION

The invention relates to the general domain of protection of digital content against illegal copying and of identification of sources at the origin of an illegal copy. More specifically, the invention relates to a method for rapid decoding for a probabilistic anti-collusion code aiming to identify one or more sources at the origin of an illegal copy of a digital content.

The domain of the invention is also known as traitor tracing, active fingerprint, user forensic or again transactional watermarking.

BACKGROUND OF THE INVENTION

The protection of digital contents, such as for example music, films, photographs and video games against the creation and distribution of illegal copies is a significant issue for the media and entertainment industries, particularly for the providers of multimedia content and copyright owners.

For this purpose, various technical solutions are known to overcome the creation and distribution of illegal contents. Solutions based on the encrypting of data preventing the actual creation and distribution of illegal copies. Dissuasive solutions based on the traceability of legal copies enabling the sources of the illegal copy to be identified. The domain of the invention falls into this last category of dissuasive solutions.

The identification of sources at the origin of an illegal copy has numerous applications. For example, a video-on-demand server distributes personal copies of a same content to different clients. Some dishonest clients, called pirates, illegally redistribute a copy of this content for example on a P2P (Peer-To-Peer) network. The copyrights owner would like to identify the pirates. To do this, the video-on-demand server inserts a unique identifier in each of the copies using a video watermarking technique thus producing so many different copies although they appear to be identical. The content identifier in the illegal copy thus enables the source of this illegal copy, and therefore the pirate, to be identified. However in order not to be recognised, a group of pirates can alter the identifier by constituting an illegal copy by mixing their different copies: this is collusion of copies. Finally, this same group of pirates can, notably by compressing the illegal copy with losses, attempt to introduce errors in the identifier of the illegally distributed copy and thus either have innocent people accused, or mask the identity of the pirates.

For this purpose, it is known that the identifier inserted into the copy by watermarking is a sequence of symbols of an anti-collusion code. Cryptographers, such as D. Boneh and J. Shaw in "*Collusion-secure fingerprinting for digital data*" (in "IEEE Transactions on Information Theory" volume 44, pages 1897-1905, September 1998) have shown the existence of an optimal code of minimum length enabling by decoding of the mix of a finite number of code sequences, to identify the subset of original sequences used for the collusion whatever the collusion strategy used to create the copy.

Such an optimal code known and widely used was proposed by Tardos in 2003 in "Optimal probabilistic fingerprint codes" (in "Proc. of the 35th annual ACM symposium on theory of computing" pages 116-125, San Diego, Calif., USA, 2003. ACM). This probabilistic code responds to the performance criteria of a uniformly efficient decoding system whatever the collusion strategy employed. It is characterized by its length that depends upon the number of users (corresponding to the number of sequences in the code), the maximum number of dishonest users (corresponding to the number of sequences in the code that will be attempted to be identified), the number of symbols in the alphabet, the false alarm probability (the fact of accusing a user who was not party to the collusion) and the miss probability (the fact of not identifying a user who was party to the collusion).

Philips has shown (in "Tardos fingerprinting is better than we thought" by B. Skoric, T. Vladimirova, M. Celik, and J. Talstra, "IEEE Transactions on Information Theory" volume 54, pages 3663-3676, Août 2008) that if we want to maintain the probability of a false alarm below a certain threshold $\epsilon$, the length of code must be greater than $2\pi^2 c^2 \log(n\epsilon^{-1})$ for a binary code such as that of Tardos where c represents the number of dishonest clients and n the number of clients in total. Philips (in "Symmetric Tardos fingerprinting codes for arbitrary alphabet sizes" by B. Skoric, S. Katzenbeisser and M. Celik, "Designs, Codes and Cryptography", 46(2):137-166, February 2008) also addressed the generalisation of the Tardos code to a code designed on an alphabet of arbitrary size in keeping with the idea of minimizing the length of code.

The technical problem of these solutions is the length of the code. On the one hand, the number of symbols that can be hidden in a multimedia content using watermarking techniques being limited, the length of the code must remain compatible with the size of the content to be identified. On the other hand, the complexity of the decoding being directly related to the length of the code, it must remain minimal to limit the calculating power and memory size means of the decoding device. Moreover, the length of anti-collusion codes increases to handle the growing number of services users particularly of video-on-demand services and potentially of dishonest users.

In a first patent application filed the same day as the present application by the same applicant, an iterative method for decoding such a code comprising a step of estimation of the collusion strategy associated with a step of identification of sequences present in the collusion was proposed. This method presents the advantage of improving the code decoding performances and of being resistant to errors introduced by noise in the transmission or by transformation of the content. The decoding performance enables limiting of the length of code used to identify the sequences in the collusion and thus provides a solution to the technical problem. However, this decoding method, due to its iterative method, requires significant calculating power and memory size means. A second technical problem is therefore the complexity of iterative decoding that can render it impossible to use for a code supporting a great number of sequences.

SUMMARY OF THE INVENTION

The purpose of the invention is to overcome at least one of the disadvantages of the prior art by improving the performances of a probabilistic anti-collusion code such as the Tardos code, not at the creation of the code but at the decoding of it while limiting the complexity of this decoding operation. In the prior art, the decoding performance is ensured whatever the collusion strategy of the dishonest users. The idea of the invention is to make hypotheses on the possible collusion strategies then to select the most probable strategy from among these hypotheses in a manner to improve the performances of the code. This selection is in addition relatively simple to implement as the probability calculations only depend on the sequence in the illegal copy and the code symbols.

In addition, the invention proposes a method of filtering of code sequences from among which the decoding method seeks to identify its presence in the collusion. Advantageously this filtering method reduces the complexity of the decoding.

For this purpose the invention relates to a decoding method for a probabilistic anti-collusion code aiming to identify at least one sequence of the code present in the multimedia content having served in the creation of an illegal copy of the multimedia content, this method comprising a step of selection of the collusion strategy used to constitute the copy from among a set of collusion strategy models. In fact, different collusion strategies can be used by the group of pirates to create the illegal copy by mixing their copies block by block, as an example can be cited uniform pulling, majority vote, minority vote, random vote. The decoding method according to the invention is particularly well adapted when the strategy is random and when the strategy does not change for a given collusion of copies. Contrary to what the prior art teaches on the accusation strategy known as the uniform strategy where no hypothesis is formed on the collusion strategy, the decoding method according to the invention determines the strategy used by the pirate group to create the illegal copy. This knowledge advantageously renders the decoding method more efficient for a given length of code. It thus enables to reduce the number of code symbols for a probability to accuse a given innocent. In addition, contrary to what is taught by the patent application filed this day by the applicant proposing an iterative decoding method where the collusion strategy is estimated by analysing both the sequence of the illegal copy and the sequences in the collusion, the estimation of the collusion strategy according to the invention is based only on the analysis of the sequence in the illegal copy. Though less precise, this estimation has the advantage of not calling upon an iterative method and of thus rendering less complex the decoding method according to the invention. Contrary to an iterative method, the decoding method according to the invention enables an increasing number of code sequences required for an increasing number of users of content provider services or an increasing number of pirates to be efficiently confronted.

According to a particular characteristic of the invention, the collusion strategy is represented, for a number of sequences present in the collusion, by a vector of probabilities of the collusion strategy constituted for each list of symbols of the sequences present in the collusion, of the conditional probability of observing the symbol in the illegal copy knowing the list of symbols of sequences present in the collusion. This representation uses the hypothesis on the estimation of the collusion strategy of the method presented in the patent application filed this day by the applicant where the collusion strategy is estimated by analysing both the sequence of the illegal copy and the sequences in the collusion. In fact the collusion strategy can, in the statistical domain, be modelled by a probabilities vector: the conditional probability that a pirate places a given symbol in the illegal copy knowing all the symbols of pirates implicated in the collusion. The collusion strategy also comprises knowledge of the number of pirates in the collusion.

According to another particular characteristic of the invention, the set of models of collusion strategies comprise for each estimation of the number of sequences present in the collusion, the most probable collusion strategy In fact, the creation of this set and the selection of a collusion strategy according to its probability enable an iterative method to be overcome by estimating all the possible cases of collusion only from the sequence in the illegal copy. All of the possible cases of collusion have parameters set by the number of sequences in the collusion and the list of symbols of sequences present in the collusion.

According to another particular characteristic of the invention, it comprises steps of:
a) Creation of a set of models of collusion strategies, namely,
 i. For each estimation of the number of sequences in the collusion and for each list of symbols of sequences present in the collusion, calculation of an estimator of the probability of the collusion strategy knowing the sequence contained in the illegal copy,
 ii. For each estimation of the number of sequences in the collusion, selection of the collusion strategy a posteriori that maximises the estimator of the probability of the collusion strategy;
b) Selection of the collusion strategy from among the set of models of collusion strategies namely,
 i. For each estimation of the number of sequences in the collusion associated with the most probable collusion strategy, calculation of the vector of probabilities of the presence of a sequence in the collusion constituted, for each sequence of the code, of the conditional probability of the presence of a given sequence in the collusion knowing the sequence contained in the illegal copy, the given sequence and the most probable collusion strategy,
 ii. For each estimation of the number of sequences in the collusion associated with the most probable collusion strategy, calculation of the probability of the model of the collusion strategy from the vector of probabilities of the presence of a sequence in the collusion and of the probability of the collusion strategy knowing the sequence contained in the illegal copy,
 iii. Selection from among the set of models of collusion strategies, of the number of sequences in the collusion associated with the most probable collusion strategy that maximises the probability of the model of the collusion strategy;
c) Identification of at least one sequence of the code present in a multimedia content having served in the creation of the illegal copy from the conditional probability of the presence of the sequence knowing the model of the collusion strategy estimated in step b).

In fact, from the modelling in the form of a vector of probabilities of the collusion strategy, an estimator of the probability of the collusion strategy is defined: It is the probability a posteriori of a collusion strategy knowing the sequence contained in the illegal copy. The most probable collusion strategy for a given number of pirates is the collusion is therefore the collusion strategy that maximises the probability a posteriori of a collusion strategy. Advantageously this first criterion enables for an estimation of the number of pirates in a given collusion, the most probable strategy for this number of sequences to be selected, and thus to create the set of models of collusion strategies according to one of the embodiments.

In addition, a second step will enable the most probable model to be selected, that is to say the number of sequences in the collusion associated with the most probable collusion strategy. This step uses for the calculation of the probability of the model, in addition to the probability of the collusion strategy, the accusation that is to say the identification of a user in the collusion process. The accusation is modelled by a probabilities vector: the probability that a user participates in the collusion. Advantageously the use of these two probabilities enables the number of sequences of the model of the collusion strategy and the accusation to be correlated. The selection of the collusion strategy from among the set of models thus produced renders the decoding method less greedy in calculating power than an iterative method.

Finally in a last step, the accusation itself is carried out using the collusion strategy selected in step b). The probabilities of presence in the collusion are clearly distinct between the dishonest users and the honest users. This separation renders the decoding method according to the invention very interesting due to its performance verses complexity ratio, particularly in comparison with the iterative method taught in another patent application. By proposing a decoding method that is efficient with respect to the uniform accusation methods (that is to say that operate without forming an hypothesis on the collusion strategy), the invention also enables the length of code required for the identification of pirates to be reduced.

According to another particular characteristic of the invention, after the selection of the most probable collusion strategy, a sequence of code is identified as being present in the multimedia content having served in the creation of the illegal copy when the value of the conditional probability of presence for this sequence in the collusion is maximal knowing the sequence contained in the illegal copy, the sequence and the model of the collusion strategy selected in step b). This characteristic enables accusation of the user who has the highest probability of being guilty.

According to another particular characteristic of the invention, after the selection of the most probable collusion strategy, a group of code sequences is identified as being present in the multimedia content having served in the creation of the illegal copy when the value of the conditional probability is greater than a threshold S for each of the sequences of this group knowing the sequence contained in the illegal copy, the sequence of the group and the model of the collusion strategy selected in step b). This characteristic enables for example users that have a probability of being guilty greater than that of being innocent to be accused if the threshold is fixed at ½. In addition, it is of interest to underline that a clear separation is observed between the probabilities of innocent individuals and the probabilities of guilty individuals. This characteristic is a performance criterion of a decoding method of an anti-collusion code. Advantageously this threshold can also be determined to reduce the probability of accusing an innocent individual or of missing a pirate. Hence, the copyrights owner or the content provider that seek to identify a source at the origin of an illegal copy can choose to trace a single user with a higher degree of certitude or to trace a group of user that are probably at the origin of the collusion. Advantageously these last two characteristics enable a response to the various expectations of clients of such solutions as "traitor tracing", such as content providers or database managers.

According to a particular embodiment, the decoding method comprises a step of filtering of code sequences comprising the selection of a sub-group of the smallest possible code sequences containing at least one sequence present in the multimedia content having served in the creation of the illegal copy by comparing for each code sequence and for a selected given symbol index, the symbol of the code sequence with the symbol of the sequence contained in the illegal copy. By limiting the number of sequences from which to look for a pirate, this filtering, very simple to implement, limits the complexity of the decoding and thus renders the decoding method particularly advantageous for a code supporting a great number of users. In fact, depending on the collusion strategy used by the pirates, filtering enables just 0.1% to 20% of the users to be retained that is to say of code sequences.

This filtering therefore enables at least four fifths of users to freed from the calculations in the particularly calculating power greedy steps a) and b). However a negative aspect of this filtering is that it limits the accusation to a single pirate and that the sequence in the illegal copy must be free of errors. In fact, the filtering method ensures that, without an erroneous symbol in the sequence of the illegal copy, the sub-group contains at least one pirate sequence having provided the index symbol selected in the sequence of the illegal copy but nothing ensures that there is more than one. Advantageously this embodiment of rapid decoding can be used as a first analysis, and can be verified thereafter by an optimal decoding as taught by the prior art in an additional analysis.

According to another particular characteristic of the invention, the step of filtering of code sequences verifies that the sequence contained in the copy is the result without error of a collusion of code sequences. In fact, the filtering method based on the presence of a given symbol in the sequence of the copy does not tolerate any errors on this symbol. This verification thus enables the filtering method to be applied if the sequence of the copy is the result without error of a collusion of code sequences and thus enables the probability of accusing an innocent individual to be limited. However this limitation renders the method less robust against errors due to noise and content distortion than the iterative decoding method presented in another patent application. If an error is detected in a sequence of the illegal copy, the method presented by the applicant in another application filed this day would be advantageously used.

According to a particular embodiment, after the identification of at least one sequence present in a multimedia content having served in the creation of the illegal copy, the method is reiterated to identify at least one new sequence in the collusion. Hence when an a priori exists on the culpability of a user, resulting for example from a previous rapid decoding method, the parameters of the decoding method are adapted and the same accusation method is used. This embodiment offers the advantage of proposing the accusation of more than one dishonest users in the case of a filtering of sequences. This embodiment associated with the step of filtering of sequences, can also propose a solution to converge more quickly to the identification of sources at the origin of the illegal copy.

According to a particular characteristic of the invention, the collusion strategy is noted as $\theta_c = \{\text{Prob}[y|t], y \in \chi, t \in T^q_c\}$ where c is the number of sequences present in the collusion and $\{\text{Prob}[y|t], y \in \chi, t \in T^q_c\}$ is the vector of probabilities of the collusion strategy constituted for each list t of symbols, of the conditional probability Prob[y|t] to observe the symbol in the sequence y of the illegal copy knowing the list t of symbols of sequences present in the collusion from among the set noted as $T^q_c$ of possible lists created from c symbols of an alphabet q-ary noted as $\chi = \{0, 1, \ldots, q-1\}$. In fact the collusion strategy can, in the statistical domain, be modelled by a probabilities vector: the conditional probability that a pirate places a given symbol in the illegal copy knowing all the symbols of pirates implicated in the collusion. The modelling of the collusion strategy also comprises knowledge of the number of pirates c in the collusion.

According to another particular characteristic of the invention, in the step a) of creation of a set of models of collusion strategies, the estimator of the probability of the collusion strategy $\theta_c$ is noted as $L_{blind}(\theta_c) = \text{Log}(\text{Prob}[y|\theta_c])$ where Prob$[y|\theta_c]$ is the conditional probability to observe the sequence y in the illegal copy knowing the collusion strategy $\theta_c$ for a number c of sequences present in the collusion. This estimator has the advantage of only depending on the analysis of the sequence in the illegal copy and the knowledge of the set of lists of c symbols that can be created from an alphabet of q symbols. Its estimation not depending on the accusation, it does not require an iterative calculation. In addition, according to a particular embodiment, the calculation of this estimator is advantageously accelerated by pre-calculating the different sub-terms of the estimator for each possible symbol of the sequence of the illegal copy thus improving the performance of the decoding.

According to another particular characteristic of the invention, in step b) of selection of the collusion strategy, the probabilities vector of the presence of a sequence $x_j$ in the collusion is noted as $\{\text{Prob}[s_j^c=1|x_j, y, \theta_c^*], j \in [1,n]\}$ where $s_j$ is a variable equal to 1 if the sequence $x_j$ is present in the collusion and where $\text{Prob}[s_j^c=1|x_j, y, \theta_c^*]$ is the conditional probability of the presence represented by $s_j^c=1$ of a given sequence $x_j$ in the collusion of c sequences among the n sequences of the code knowing the sequence contained in the illegal copy y, the sequence $x_j$ and the most probable collusion strategy $\theta_c^*$. In fact the accusation can be modelled by a probabilities vector: the probability that a user participates in the collusion. The variable $s_j^c$ represents this participation, it is equal to 1 if the user j participated in the collusion and to 0 if the user j is innocent. The accusation rests on the evaluation of the probability that $s_j^c=1$. This probability proposes a culpability score that advantageously enables a guilty individual (maximum score) or a group of guilty individuals (score greater than a threshold) to be identified.

In addition, the invention relates to a method for filtering sequences of a probabilistic anti-collusion code for the decoding of this code aiming to identify at least one sequence of the code present in a multimedia content having served in the creation of an illegal copy of the multimedia content comprising a step of selection of a sub-group of the smallest possible code sequences containing at least one sequence present in a multimedia content having served in the creation of the illegal copy by comparing for each sequence of the code and for a selected given symbol index, the symbol of the sequence of the code with the symbol of the sequence contained in the illegal copy. By limiting the number of sequences in which to search for a pirate, this filtering, that is very simple to implement, limits the complexity of the decoding. This filtering method is particularly advantageous for any code decoding method supporting a great number of users. In fact, depending on the collusion strategy used by the pirates, the filtering enables just 0.1% to 20% of the users to be retained that is to say of code sequences.

According to particular characteristic of the invention, the method for filtering code sequences verifies that the sequence contained in the copy is the result without error of a collusion of code sequences. In fact, the filtering method based on the presence of a given symbol in the sequence of the copy does not tolerate any errors on this symbol. This verification therefore enables the filtering method to be applied only if the sequence of the copy is the result without error of a collusion of code sequences.

According to a particular embodiment, the anti-collusion code is a Tardos code.

BRIEF DESCRIPTION OF THE DRAWINGS

The invention will be better understood and illustrated by means of embodiments and advantageous implementations, by no means limiting, with reference to the figures in the appendix, wherein.

DETAILED DESCRIPTION OF PREFERRED EMBODIMENTS OF THE INVENTION

The protection of contents against collusion is composed of two layers: the anti-collusion code and the watermarking of the content. The code provides the identifier or series number of the content, the watermarking provides a method for insertion of data in a content.

Figure 1:
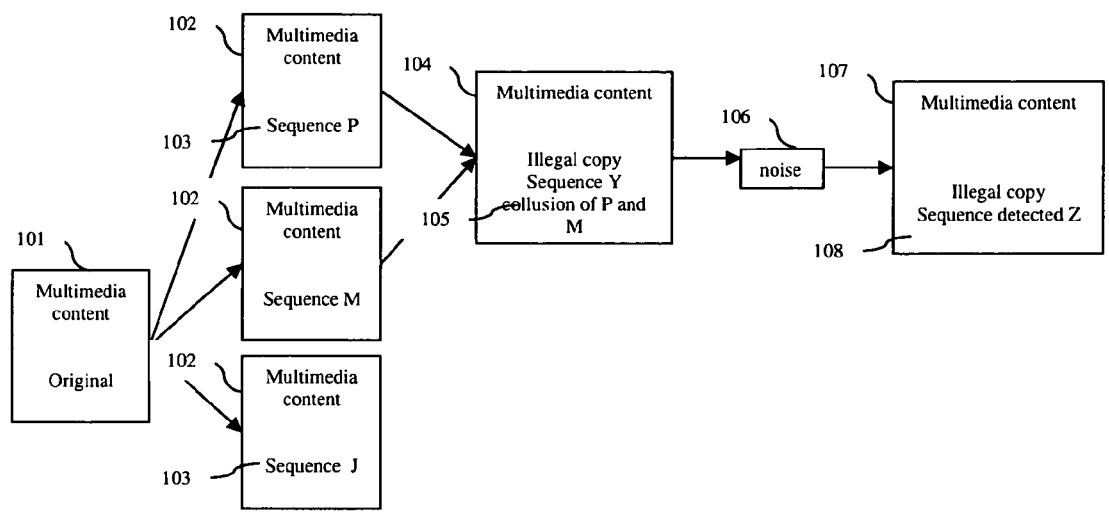
FIG. 1 shows the principle of creation and distribution of illegal copies by collusion of contents.

FIG. 1 diagrammatically illustrates the principle of creation and distribution of illegal copies by collusion of contents. A content provider proposes for example over the Internet, a multimedia content 101 that comprises notably a film or a video, music or audio, a video game, a digital book or any other digital document. According to the principle known as active fingerprinting, the content provider inserts in each of the copies 102 legally distributed a unique series number 103 enabling the source of the copy and thus its user to be identified. This series number 103 is a sequence of an anti-collusion code such as the Tardos code. This series number 103 is inserted into the copy using a watermarking method rendering each copy apparently identical to the unique user. The content is cut into blocks and the symbols of the series number are hidden block by block in the content. To illegally propose a copy of this content while protecting their identities, a group of pirate users such as P and M can create a copy 104 by mixing their different personal copies block by block, thus producing the series number Y 105 that does not correspond to a code sequence: This is the collusion of copies. In addition this series number Y 105 can also be altered by a compression with loss of the illegal copy, by a low-pass filtering, by an addition of noise that interferes with the decoding method of the watermarking layer. The collusion of copies can also be realised by merging of blocks. In this case, the users mix their copies pixel by pixel in the case of an image or a video, sample by sample in the case of an audio document. For example, the pixels of the copy are the mean, the median (if more than two copies are mixed), the minimum or the maximum of pixels of each of the copies. In this case, it is the robustness of the method for decoding the watermarking that is challenged so as to detect the correct series number. These modifications of the series number that is to say of the anti-collusion code sequence are modelled by the noise 106, the series number detected in the illegal copy 107 for which the sources are sought is then noted as Z 108.

Figure 2:
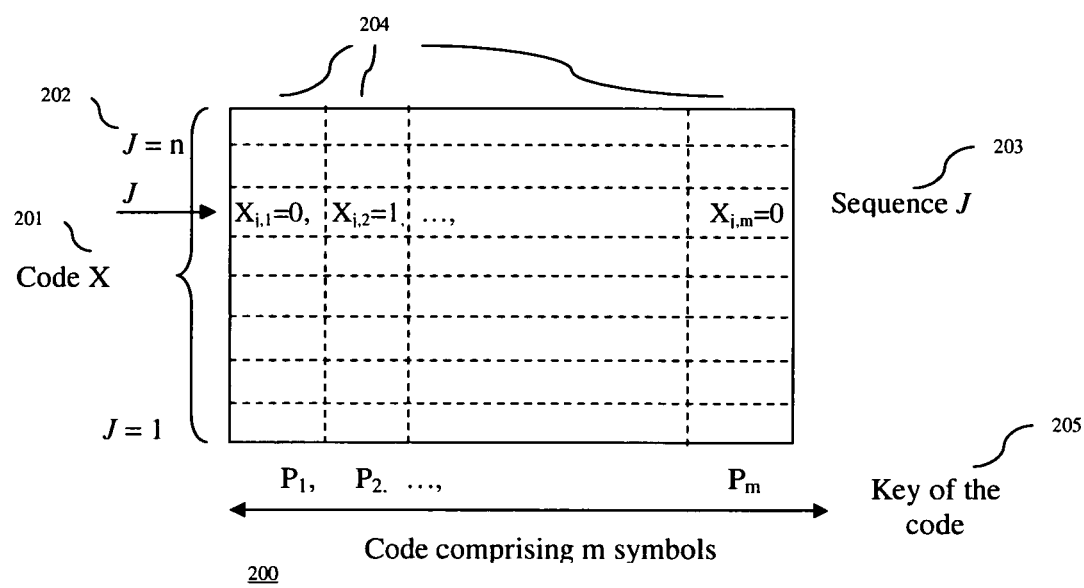
FIG. 2 shows the principle of a Tardos code.

The probabilistic anti-collusion codes such as the Tardos code were designed to enable different sources at the origin of a copy obtained by collusion to be identified. FIG. 2 shows the construction principle of such a code X 201. This code is constituted of n sequences 202 $\{x_j\}^{j=1,n}$ where the index j of the sequence varies from 1 to n. Each sequence 203 $x_j$ is associated with a user j. A sequence is a list of m symbols 204 $x_j=\{x_{j,1}, x_{j,2}, \ldots x_{j,m}\}$. These symbols 204 belong to a q-ary alphabet $\chi=\{0, 1, \ldots, q\}$. In the case of the Tardos code as represented in FIG. 2, this alphabet is binary $\chi=\{0, 1\}$ and $x_j=\{0, 1, \ldots, 0\}$ for example.

The generation of a probabilistic code is pseudo-random. From a key 205 $\{P_1, P_2, \ldots P_m\}$, there is a statistical law p such that for any sequence j∈{0, ..., n}, and for any symbol i∈{0, ..., m} in the sequence:

$$\text{Prob}[x_{j,i}=x]=p(x,i).$$

The values p(x,i) are memorized in a matrix P 200, called the auxiliary variable matrix of the code. The line indexes of this matrix are the n sequences of the code and the column indexes are the m symbols of sequences. This matrix corresponds to a database serving as a secret key to list in addition all the sequences 202 of the code X 201.

Figure 3:
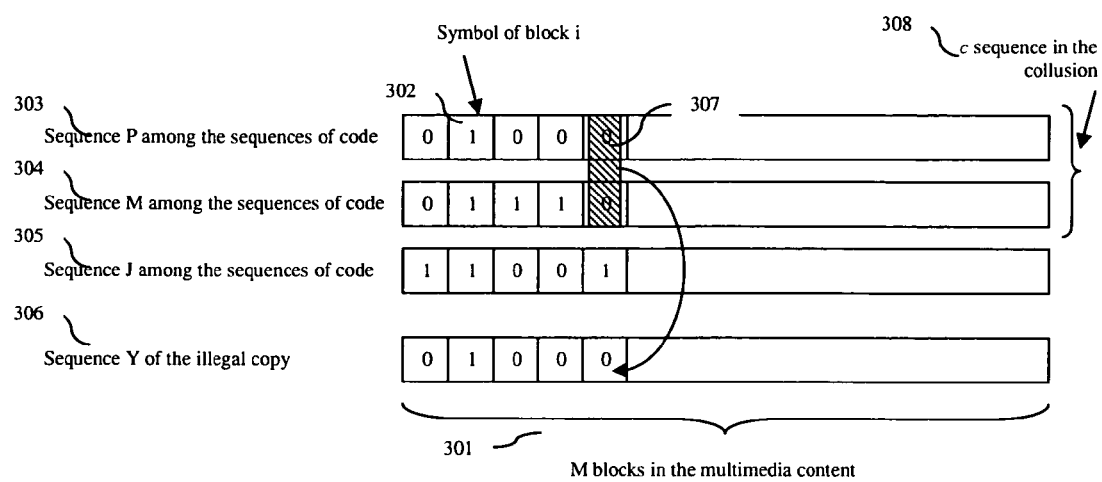
FIG. 3 shows the strategy of choice of symbols in the collusion of copies.

The anti-collusion codes have the following property: from a mix of symbols of a finite number of code sequences, the decoding of the new sequence thus obtained enables the subset of original sequences used by the mix to be found again. A code is designed for a maximum number n of sequences (and hence of users) and a maximum number c of original sequences in the mix (and hence of dishonest users) that can be found again. According to the prior art, the decoding performance is uniform whatever the collusion strategy. The decoding method according to the invention comprises the selection of hypotheses on the collusion strategy in a way to improve the decoding performances. Different collusion strategies will be more easily explained using FIG. 3. The multimedia content that is being attempted to be protected is cut into m blocks 301. Each block i hides, using a watermarking technique, a symbol $x_i$ 302 of anti-collusion code, thus proposing a version of the block i specific to the hidden symbol. The principle of watermarking not being sufficiently secure, users are capable of finding the blocks of the watermarking layer. However they are not capable of extracting the inserted item of data, in other words the pirates are not able to create a block masking a symbol that they do not have. Dishonest users thus constitute a copy 306 by assembling for each of the blocks of the original content P 303 or M 304, a version from among the set of versions of the block that they know 307. The pirates for example do not know the versions of blocks of the original content J 305. Thus, if the collusion groups together c dishonest users 308, their copies are identified by the sequences for which the indexes are C={$j_1$, ..., $j_c$}, and for a block $y_i$ of given index i, they are limited to a choice from among $y_i \in \{x_{j_1,i}, \ldots, x_{j_c,i}\}$. This therefore imposes a limit on the possible number of sequences that the pirates can constitute.

Different collusion strategies have been imagined:
Uniform pulling, a block is pulled from among the blocks of users in the collusion with a probability equal for each for example ½ in the case where there are two.
Majority vote, a block is selected due to its greater presence among the blocks of users in the collusion.
Minority vote, a block is selected due to its lesser presence among the blocks of users in the collusion.
Random vote, a block is selected randomly among the blocks of users in the collusion.

In all cases, the knowledge and distribution of symbols that the pirates have available is important, it is the notion of type. The symbols of c sequences present in the collusion are distributed in a type t, the type t being a vector of q values for which the $k^{th}$ component t(k, i), for a symbol index i and for the c sequences j potentially present in the collusion, indicates the number of symbols in the list of symbols $\{x_{j_1,i}, \ldots, x_{j_c,i}\}$ possible equal to the symbol k, the set of types t possible created from the c sequences of symbols of a q-ary alphabet being referred to as $T^q_c$.

According to a particular characteristic of the invention, the collusion strategy is defined as the conditional probability that the pirates place a symbol y in the illegal copy knowing the type of all the symbols that they have. This modelling noted as Prob[y|t] with y∈χ is one possible representation in the probabilistic domain of different strategies notably those previously cited whether they are determinist or random. For example in the case of a majority vote (where a block is selected if it is more present among the blocks of users in the collusion), the Prob[y|t] will be maximal for the type comprising the maximum number of identical symbols among the sequences in the collusion. The decoding method according to the invention is particularly well adapted when the strategy is random but it does not change for a given collusion of copies.

According to another particular characteristic of the invention, the presence of a user in the collusion is also modelled in the probabilistic domain. A variable $s_j$ is defined that takes the value 1 if the sequence j is identified as being present in a multimedia content having served in the collusion, and the value 0 if not. The presence of a user in the collusion is then modelled by the probability Prob[$s_j$=1].

Figure 6:
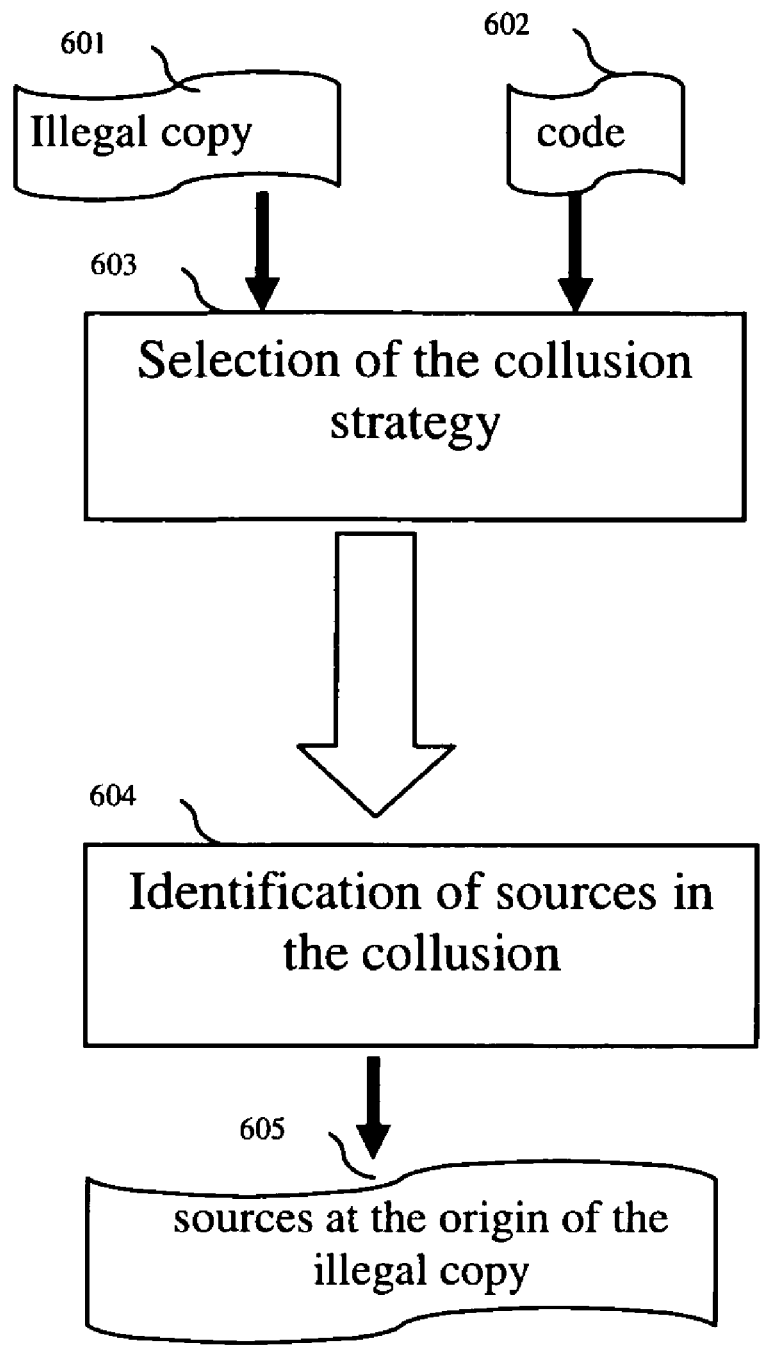
FIG. 6 shows a decoding method according to the invention.

The decoding method according to the invention is based on this double modelling of the problem of resistance against collusion. In fact contrary to what the prior art teaches on the accusation strategy known as the uniform strategy where no hypothesis is formed on the collusion strategy, the decoding method according to the invention determines the strategy used by the pirate group to create the illegal copy. In addition contrary to an iterative method taught in another patent application, the decoding method according to the invention determines the collusion strategy used by a double selection based on the probability of the collusion model from among a set of possible models. FIG. 6 shows the decoding method according to the invention. From the sequence contained in the illegal copy (601) and code sequences (602), the decoding method of an anti-collusion code determines the sources at the origin of the illegal copy (605). The method comprises in addition to a step of identification of sources (604) as taught by the accusation methods called uniform methods, a step of selection of the collusion strategy (603). This collusion strategy represents the selection carried out by the pirates to create the illegal copy for example uniform pulling, the majority vote, the minority vote or random vote.

Figure 4:
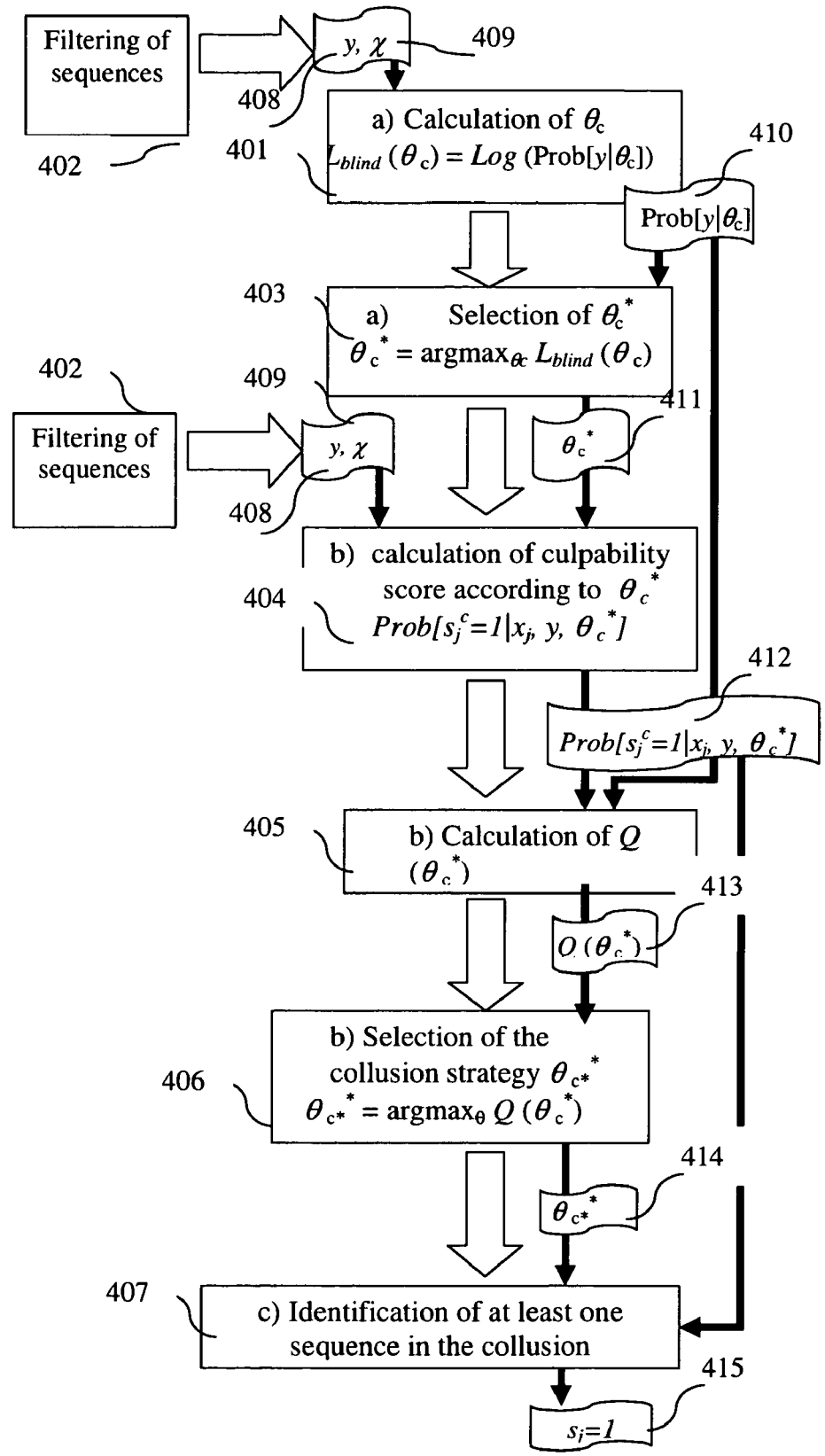
FIG. 4 shows a method for decoding an anti-collusion code according to an embodiment of the invention.

FIG. 4 shows one of the embodiments of the rapid decoding method for a probabilistic anti-collusion code X constituted of n sequences $\{x_j\}^{j=1,n}$ aiming to identify at least one code sequence X present in a multimedia content having served in the creation of an illegal copy of multimedia content from the selection of the collusion strategy used to constitute the copy from among a set of models of collusion strategies. The set of models created depends on two parameters: the number of pirates in the collusion on one hand and the list of symbols of sequences present in the collusion on the other hand. The number of pirates c in the collusion varies between $c_{min}$ and $c_{max}$. If no hypothesis on the number of sequences in the collusion is possible, $c_{min}$ is fixed at 1 and $c_{max}$ must not exceed the maximum number of traitors considered during the construction of the code. During a first step 401, an estimator of the probability of the collusion strategy knowing the sequence y contained in the illegal copy is calculated. This estimator uses the modelling of the collusion strategy noted as $\theta_c = \{\text{Prob}[y|t], y \in \chi, t \in T^q_c\}$ where c is the number of sequences present in the collusion and $\{\text{Prob}[y|t], y \in \chi, t \in T^q_c\}$ is the vector of probabilities of the collusion strategy constituted for each list t of symbols, of the conditional probability Prob[y|t] to observe the symbol in the sequence y of the illegal copy knowing the list t of symbols of sequences present in the collusion from among the set noted as $T^q_c$ of possible lists created from c symbols of a q-ary alphabet noted as χ={0, 1, ..., q−1}. In taking into account this model, the probability a posteriori of a given collusion strategy to observe the sequence y in the illegal copy is:

$$\text{Prob}[y|\theta_c] = \Pi_{i \in [1,m]} \text{Prob}[y(i)|\theta_c] = \Pi_{i \in [1,m]} (\Sigma_{t_i \in T_{cq}} \text{Prob}[y(i)|t_i] \text{Prob}[t_i]),$$

where i is the symbol index varying from 1 to m and where for a symbol index i and for the c sequences in the collusion $t_i$ is a vector constituted, for each symbol of the code, of a list of c symbols on an alphabet of q symbols. The most probable collusion strategy is that which maximises the probability a posteriori of the collusion strategy to observe the sequence y. An estimator of the probability of the collusion strategy $\theta_c$ is noted as $L_{blind}(\theta_c) = \text{Log}(\text{Prob}[y|\theta_c])$ where $\text{Prob}[y|\theta_c]$ is the conditional probability to observe the sequence y in the illegal copy knowing the collusion strategy $\theta_c$ for a number c of sequences present in the collusion. This estimator depends only on the knowledge of the sequence y 408, the symbols of the code $\chi = \{0, 1, \ldots, q-1\}$ 409 and the secret key $\{P_1, P_2, \ldots P_m\}$ 205.

According to an embodiment variant, the different terms $\text{Prob}[y(i)|t_i] \cdot \text{Prob}[t_i]$ of the a posteriori probability of a given collusion strategy to observe the sequence y in the illegal copy, are pre-calculated for each possible symbol y(i) and each list $t_i$ of c symbols in an alphabet of q symbols. These pre-calculations accelerate the calculation step of the estimator of the probability of the collusion strategy $\theta_c$ thus improving the performance of the decoding.

In step 403, for each estimation of the number of sequences c in the collusion, a first selection is made on the list of symbols of sequences in the collusion based on the maximum probability of the collusion strategy that is to say of this list. The collusion strategy that maximises the estimator of the probability for c sequences in the collusion is noted as $\theta_c^*$. Thus after this step 403, if the number of sequences in the collusion is c, then the collusion strategy is $\theta_c^*$ 411.

Step 404 comprises the calculation of a culpability score for each of the users while forming the hypothesis of the collusion strategy $\theta_c^*$. Hence the probabilities vector of the presence of a sequence $x_j$ in the collusion 412 noted as $\{\text{Prob}[s_j^c=1|x_j, y, \theta_c^*], j \in [1,n]\}$ is calculated. $s_j$ is a variable equal to 1 if the sequence $x_j$ is present in the collusion and $\text{Prob}[s_j^c=1|x_j, y, \theta_c^*]$ 412 is the conditional probability of the presence noted as $s_j^c=1$ of a given sequence $x_j$ in the collusion of c sequences among the n sequences of the code knowing the sequence contained in the illegal copy y, the sequence $x_j$ and the most probable collusion strategy $\theta_c^*$. This probabilities vector represents a culpability score of users given a collusion strategy $\theta_c^*$ 411. It constitutes with the a posteriori probability of a given collusion strategy to observe the sequence y in the illegal copy $\text{Prob}[y|\theta_c]$ 409, one of the two parameters of the probability calculation of the model of the collusion strategy. These two parameters enable the number of pirates in the collusion to be correlated with the number of pirates creating by mixing the sequence of the copy. The calculation of the probability of the model of the collusion strategy noted as $Q(\theta_c^*)$ 413 is carried out in step 405. During step 406, a second selection from among the set of models enables the number of sequences in the collusion to be determined as well as the collusion strategy associated namely $\theta_{c*}^*$ 414 that maximizes the probability of the model noted as $Q(\theta_c^*)$ 413 namely $\theta_{c*}^* = \text{argmax}_\theta Q(\theta_c^*)$.

Finally in a step 407, the calculation of the culpability score of the users that is to say the vector of probabilities of the presence of a sequence $x_j$ in the collusion 412 is updated according to the collusion strategy $\theta_{c*}^*$ obtained by selection according to the probability criteria of steps a) 401, 403 and b) 404, 405, 406. Then, this same step 407 determines at least one sequence of the code present in the multimedia content having served in the creation of the illegal copy. According to the embodiments of the invention at least two criteria can determine a sequence present in the collusion. The first criteria is the maximum value $\text{Prob}[s_j^c=1|x_j, y, \theta_{c*}^*]$ of the probability for a given sequence among the values of the vector of probabilities of the presence of a sequence in the collusion. Advantageously this criterion enables a pirate with a relatively low false alarm probability error to be identified. The second criterion is the probability value $\text{Prob}[s_j^c=1|x_j, y, \theta_{c*}^*]$ greater than a threshold S for each of the sequences j of a group among the values of the vector of probabilities of the presence of a sequence in the collusion. For example, this criterion advantageously enables users that have a probability of being guilty greater than that of being innocent to be accused if this threshold is fixed at ½. Advantageously this threshold can also be determined to satisfy false alarm or miss conditions. It is particularly interesting to underline that the scores of innocent and guilty individuals are widely separated following a decoding according to the invention, this enables guilty individuals to be accused with more assurance (that is to say for a heightened probability of false alarm or miss) or to reduce the length of code required for the identification of sources of a collusion of copies.

According to an embodiment, the decoding method can comprise a step of filtering of sequences 402. This step enables the number n of sequences of code and thus the number of symbols on which the collusion hypotheses are built to be limited. This filtering step intervenes on the data 409 of steps 401 and 404. In addition, the parameters of the decoding method with filtering are also adapted but the same accusation method is used. If i* the index of the symbol selected in the filtering method is noted, the accusation method must ignore this symbol. Thus the sequences of the code are thus the length m–1 symbols and the sequence of the copy to be taken into account is noted as y' and is equal to y from which the symbol y(i*) has been removed. The method associated with this filtering step is more widely illustrated in FIG. 5.

The decoding method according to the invention also presents the advantage of being able to take into account the knowledge of an a priori on the culpability of a user, resulting for example from a previous rapid decoding method. The parameters of the decoding method are adapted and the same accusation method is used. If a sequence present in a multimedia content having served in the creation of an illegal copy is noted as $x_i$, the vector of probabilities of the presence of a sequence in the collusion conditional on the sequence $x_i$ is written as $\text{Prob}[s_j^c=1|x_j, x_i, y, \theta_{c*}^*]$.

Figure 5:
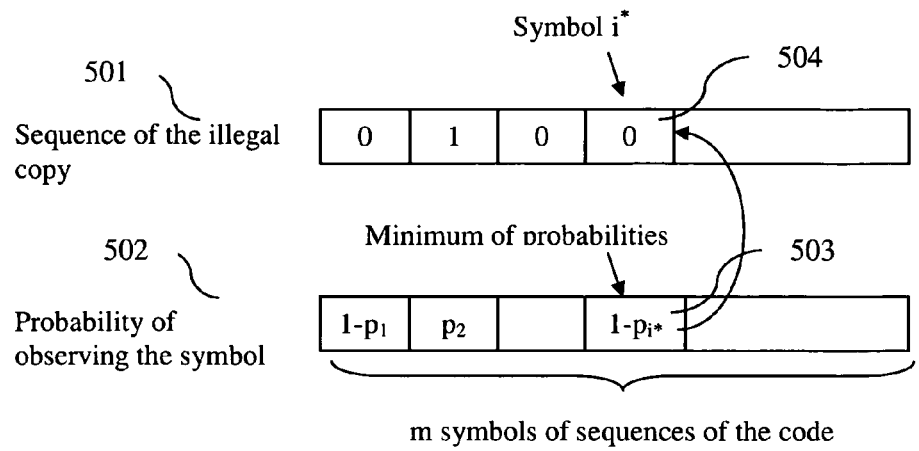
FIG. 5 shows a filtering method according to the invention.
Figure 5:
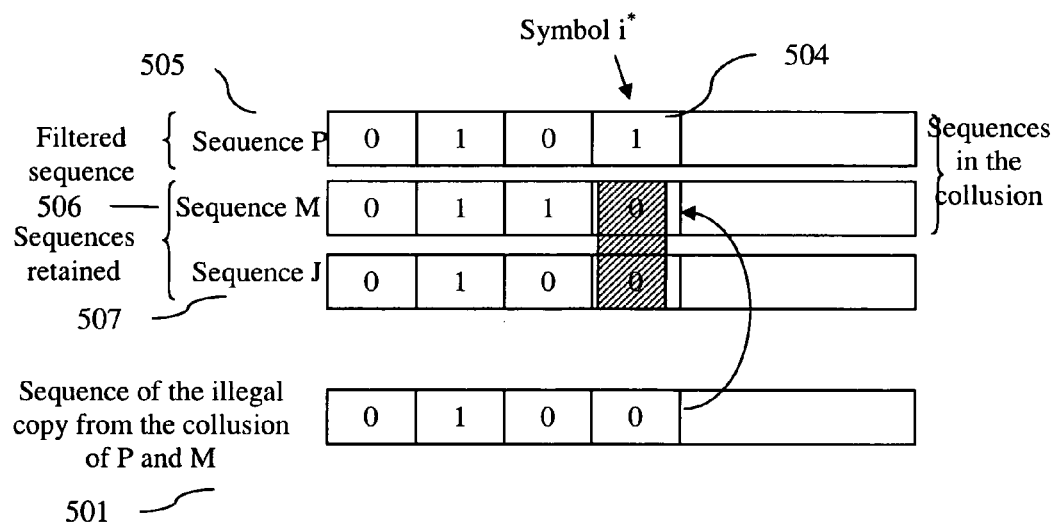

FIG. 5 shows one of the embodiments of the sequences filtering method. This filtering method is based on the hypothesis that the pirates can not create a symbol during the creation of the illegal copy by mixing their copies block by block. For a symbol index i judiciously selected from among the m symbols of a sequence of code, the symbol y(i) of the illegal copy is from one of the sequences that has this same symbol at the same index. The problem is to select an index i that will enable a smallest possible group of users to be constituted from among whom a pirate can be searched for and thus reduce the complexity of the decoding algorithm in line with the filtering. As shown in FIG. 2, a probabilistic anti-collusion code is constructed from a key 205 and a statistical law p as for any sequence $j \in \{0, \ldots, n\}$, and for any symbol $i \in \{0, \ldots, m\}$ in the sequence $\text{Prob}[x_j(i)=x]=p(x,i)$. This law enables, for a given index symbol i of the sequence 501 of the illegal copy, the probability of observing this symbol 502 to be calculated. In the case of a binary code, such as the Tardos code and as represented in FIG. 5, the symbols take the values (0,1) and if $p_1$ is the probability of observing a symbol at '1' for the index symbol i then $1-p_i$ is the probability of observing a symbol at '0' because Prob[x(i)='0']+Prob[x(i)='1']=1. The selection of the symbol index i* 504 that enables the maximum number of users for a decoded sequence y 501 to be filtered is such that the probability p(y(i),i) of observing this symbol for this index in the decoded sequence 501 is lowest i*=arg min p(y(i),i) with i∈[1,m] 503. The step following filtering, thus comprises the selection of sequences M 506 and J 507 of the code for which the index symbol i* is equal to the index symbol i* of the sequence of the illegal copy $x_M(i^*)=x_J(i^*)=y(i^*)$. It is interesting to note that in the example shown in FIG. 2, the sequences having participated in the collusion are the sequences P 505 and M 506 and that the sequences retained by the filtering are the sequences M 506 and J 507. Thus the filtering enables a sub-group to be selected when it contains at least one sequence in the collusion, the sequence M 506, but not all the sequences in the collusion, for example, the sequence P 507. this filtering method thus authorizes the decoding method to identify a sequence in the collusion but not a group of sequences as there is no guarantee that there were more than one sequences having participated in the collusion in the sub-group of sequences retained 507 by the pre-selection.

In addition, this filtering method only functions if the sequence y is the result without error of the mix of symbols of sequences in the collusion. According to a particular embodiment the mixing of filtering comprises a step of verification of the marking hypothesis namely that the sequence y does contain errors on the symbols.

According to the collusion strategy, the filtering method only retains 0.1% of the sequences of the code, in the case of the majority or minority vote, to 20% of the of the sequences of the code, in the case of the uniform pulling. This filtering method, very simple to implement, enables the complexity verses performance ratio to be improved of an anti-collusion code decoding method, in particular of the decoding method according to the invention.

According to an advantageous embodiment, the anti-collusion code is a binary Tardos code. The maximum number of sequences that the code enables by construction to recover is noted as c. Thus q=2 and there are c+1 types possible. The types can be noted as pairs $(\sigma, c-\sigma)$ where $\sigma$ is the number of symbols at '1' that the pirates possess. The number of symbols at '1' that the pirates possess, noted as $\sigma$, varies between 0 and c. The probabilities vector $\theta$ is written then for c' pirates estimated $\{\{Prob[y=1|\sigma=0], Prob[y=1|\sigma=1], \ldots, Prob[y=1|\sigma=c]\} \in [0,1]^{c'+1}$. This vector is constructed from the possibility to observe a '1' in the sequence of the illegal copy knowing that respectively no symbol of sequences of the collusion is at '1', a symbol of sequences of the collusion is at '1' and up to all of the c' symbols of sequences of the collusion are at '1'. It should equally be taken into account that without error detection on the watermarking layer and as the pirates can not create new symbols, the symbol in the illegal copy is from either the symbols at a '1' of pirates or the symbols at a '0' of pirates thus $Prob[y=1|\sigma]+Prob[y=1|c'-\sigma]=1$. It should equally be taken into account that without error detection on the watermarking layer and as the pirates can not create new symbols, the sequence of the illegal copy can not contain a symbol at a '1' if none of the pirate symbols are at '1' (namely Prob[y=1|0]=0) and inversely the sequence of the illegal copy contains a symbol at a '1' if all the pirate symbols are at '1' (Prob[y=1|c']=1).

Naturally, the invention is not limited to the embodiments previously described.

In particular, the invention is compatible with anti-collusion codes distinct from Tardos codes.

What is claimed is:

1. A method for decoding a probabilistic anti-collusion code aiming to identify at least one sequence of said code present in a multimedia content having served in the creation of an illegal copy of said multimedia content, wherein the method comprises a step of selection, by a decoding device, of a collusion strategy used in a collusion to constitute said copy from among a set of collusion strategy models, wherein said collusion strategy comprises, for a number of sequences present in the collusion, a vector of probabilities of the collusion strategy constituted for each list of symbols of the sequences present in the collusion, of the conditional probability of observing the symbol in the illegal copy knowing said list of symbols of sequences present in the collusion.

2. The method according to claim 1 wherein said set of collusion strategy models comprises for each estimation of the number of sequences present in the collusion, said collusion strategy, which is a most probable collusion strategy.

3. The method according to claim 2, further comprising the steps of:
   a) Creation of a set of models of collusion strategies by
      i. For each estimation of the number of sequences in the collusion and for each list of symbols of sequences present in the collusion, calculation of an estimator of the probability of the collusion strategy knowing the sequence contained in the illegal copy,
      ii. For each estimation of the number of sequences in the collusion, selection of said collusion strategy a posteriori that maximises said estimator of the probability of the collusion strategy;
   b) Selection of the collusion strategy from among said set of collusion strategy models by
      i. For each estimation of the number of sequences in the collusion associated with said most probable collusion strategy, calculation of the vector of probabilities of the presence of a sequence in the collusion constituted, for each sequence of said code, of the conditional probability of the presence of a given sequence in the collusion knowing the sequence contained in the illegal copy, said given sequence and said most probable collusion strategy,
      ii. For each estimation of the number of sequences in the collusion associated with said most probable collusion strategy, calculation of the probability of said model of the collusion strategy from said vector of probabilities of the presence of a sequence in the collusion and of the probability of the collusion strategy knowing the sequence contained in the illegal copy,
      iii. Selection, from among said set of collusion strategy models, of the number of sequences in the collusion associated with said most probable collusion strategy that maximises the probability of said model of the collusion strategy;
   c) Identification of at least one sequence of said code present in a multimedia content having served in the creation of said illegal copy from the conditional probability of the presence of said at least one sequence knowing said model of the collusion strategy estimated in step b).

4. The method according to claim 3 wherein in step c), a sequence of said code is identified as being present in a multimedia content having served in the creation of said illegal copy when the value of the conditional probability of presence for this sequence in the collusion is maximal knowing the sequence contained in the illegal copy, said sequence and said model of the collusion strategy selected in step b).

5. The method according to claim 3 wherein in step c), a group of sequences of said code is identified as being present in a multimedia content having served in the creation of said illegal copy when the value of the conditional probability is greater than a threshold S for each of the sequences of this group knowing the sequence contained in the illegal copy, said sequence of said group and said model of the collusion strategy selected in step b).

6. The method according to claim 4 wherein the method further comprises a step of filtering of sequences of said code comprising the selection of a smallest possible sub-group of sequences of said code containing at least one sequence present in the multimedia content having served in the creation of said illegal copy by comparing for each sequence of said code and for a selected given symbol index, the symbol of the sequence of said code with the symbol of the sequence contained in said illegal copy.

7. The method according to claim 6 wherein the step of filtering of sequences of said code verifies that the sequence contained in the copy is the result without error of a collusion of sequences of said code.

8. The method according to claim 4 wherein after identification of at least one sequence present in a multimedia content having served in the creation of said illegal copy, said method is reiterated to identify at least one new sequence in the collusion.

9. The method according to claim 1 wherein said collusion strategy is noted as $\theta_c = \{Prob[y|t], y\in\chi, t\in T^q_c\}$ where c is the number of sequences present in the collusion and $\{Prob[y|t], y\in\chi, t\in T^q_c\}$ is said vector of probabilities of the collusion strategy constituted for each list t of symbols, of the conditional probability Prob[y|t] to observe the symbol in the sequence y of the illegal copy knowing said list t of symbols of sequences present in the collusion from among the set noted as $T^q_c$ of possible lists created from c sequences of symbols of an alphabet q-ary noted as $\chi = \{0, 1, \ldots, q-1\}$.

10. The method according to claim 3 wherein in step a) of creation of a set of models of collusion strategies, the estimator of the probability of the collusion strategy $\theta_c$ is noted as $L_{blind}(\theta_c) = Log(Prob[y|\theta_c])$ where $Prob[y|\theta_c]$ is the conditional probability to observe the sequence y in the illegal copy knowing the collusion strategy $\theta_c$ for a number c of sequences present in the collusion.

11. The method according to claim 3 wherein in step b) of selection of the collusion strategy, the probabilities vector of the presence of a sequence $x_j$ in the collusion is noted as $\{Prob[s_j^c=1|x_j, y, \theta_c^*], j\in[1,n]\}$ where $s_j$ is a variable equal to 1 if the sequence $x_j$ is present in the collusion and where $Prob[s_j^c=1|x_j, y, f_c^*]$ is the conditional probability of the presence represented by $s_j^c=1$ of a given sequence $x_j$ in the collusion of c sequences among the n sequences of said code knowing the sequence contained in the illegal copy y, said sequence $x_j$ and said most probable collusion strategy $\theta_c^*$.

12. The method according to claim 1, wherein the anti-collusion code is a Tardos code.

* * * * *